United States Patent
Scheidegger et al.

(10) Patent No.: US 6,803,737 B2
(45) Date of Patent: Oct. 12, 2004

(54) CONTROL SYSTEM FOR A MOTOR

(75) Inventors: Michaël Scheidegger, Yverdon (CH); Jean-Marc Chenuz, Mont-la-Ville (CH)

(73) Assignee: Valtronic S.A., Les Charbonnieres (CH)

( * ) Notice: Subject to any disclaimer, the term of this patent is extended or adjusted under 35 U.S.C. 154(b) by 0 days.

(21) Appl. No.: 10/194,088

(22) Filed: Jul. 12, 2002

(65) Prior Publication Data

US 2003/0015984 A1 Jan. 23, 2003

(30) Foreign Application Priority Data

Jul. 20, 2001 (EP) .............................................. 01810724

(51) Int. Cl.$^7$ .............................................. G05B 19/05
(52) U.S. Cl. ........................ 318/567; 318/626; 318/685; 318/380
(58) Field of Search ................................ 318/268, 269, 318/272, 293, 375, 379, 380, 560, 567, 590, 599, 626, 685, 696

(56) References Cited

U.S. PATENT DOCUMENTS

| | | | |
|---|---|---|---|
| 4,339,699 A | 7/1982 | de Jonge et al. ............ 318/561 |
| 4,570,113 A | * 2/1986 | Linton et al. ................ 318/612 |
| 4,638,230 A | 1/1987 | Lee ............................. 318/632 |
| 4,710,865 A | * 12/1987 | Higomura ..................... 700/63 |
| 4,878,077 A | 10/1989 | Maeno et al. ................ 354/400 |
| 5,465,035 A | 11/1995 | Scaramuzzo et al. ....... 318/561 |
| 5,705,907 A | 1/1998 | Miyamori et al. .......... 318/599 |
| 5,847,527 A | 12/1998 | Iwashiro ..................... 318/561 |
| 6,600,286 B2 | * 7/2003 | Tanaka et al. ............... 318/560 |

* cited by examiner

*Primary Examiner*—Bentsu Ro
(74) *Attorney, Agent, or Firm*—Van Tassel & Associates

(57) ABSTRACT

The invention concerns a control system for a d.c. motor (10), powered by an actuating system (14) comprising:
- a position detector (30, 32) co-operating with the motor's rotor;
- a power supply circuit (34) to apply to the terminals of the motor coils a supply voltage to generate the electric current, and
- a control circuit (36).

This system is designed to actuate the motor to move a moving part (24), with a view to reaching a target position $P_c$ defined by a number of steps $d_c$ to be executed. During a so-called positioning phase, the control circuit (36), after observing that target position $P_c$ has been reached, interrupts the current powering the coils and applies to them a braking pulse ($I_f$) of reverse polarity, then short-circuits them until stoppage observed by the detector (30, 32).

7 Claims, 4 Drawing Sheets

CONTROL SYSTEM FOR A MOTOR

The present invention concerns a control system for a d.c. motor of the type comprising a rotor and a stator, a coil assembly and a magnetic circuit, the one integral with the rotor and the other with the stator, the rotor being driven in rotation by an electric current passing through the coils. This motor is powered by a control system comprising:

a position detector co-operating with the rotor;

a power supply circuit to apply to the terminals of the coils a supply voltage to generate the electric current, and a control circuit.

Such a system is described in U.S. Pat. No. 5,705,907, which refers more specifically to a drive control system for servo motor.

By this system, a moving part, actuated by the motor and the movement of which is measured by the detector, in this case a potentiometer, can thus reach a target position $P_c$ defined by an electrical resistance. For this purpose, the motor is, initially, powered continuously. When the part actuated approaches the target set, defined by a potentiometer resistance value, the signal applied to the motor is chopped, so as to reduce the speed and ensure more precise positioning of the object actuated. To ensure optimum positioning, the chopping rate is reduced gradually, as the object approaches the target. Thus, by adjusting the chopping rate, it is possible to adjust the positioning precision. When the target position is reached, the power supply is interrupted, so that the rotor stops. The target position is thus more or less precise, depending on the chopping rate and the energy to be supplied by the motor and the characteristics of the drive line driven by the motor.

In a variant, and to allow for the energy dissipated, the chopping rate is gradually increased, until the detector informs the control circuit that the friction torque has been overcome and that the motor is effectively running.

Such a solution allows relatively precise positioning. However, no provision has been made to allow for elastic effects in the drive line inserted between the rotor and the moving part.

Another system is described in U.S. Pat. No. 5,847,527. It relates to control of the position of a head with reference to a disc, e.g. a magnetic disc of the type designed for storing information.

By this system, the head, which performs reading and writing, is brought into work position in three phases, the so-called acceleration, deceleration and stabilization phases. By this system, the position of the head is defined digitally and not by analogue means, as in the document mentioned earlier. Position control is performed by means of two control circuits, one of which is active during the acceleration and deceleration phases, called a "bang-bang control means" working on an ON/OFF basis, while the other, called a "dead beat control means", is active during the positioning phase, and taking into account the information stored during a learning phase. The latter control system implies the use of high-performance and relatively costly IT systems.

In these systems, the position of the moving part actuated by the motor is monitored while the part is in movement. This implies that there be powerful computing resources or that the precision aimed at is low. Measurement stops as soon as the power supply is interrupted. The object of the present invention is to allow the implementation of a system requiring inexpensive resources, which ensures high positioning precision. This system is applicable even if the elasticity of the assembly inserted between the rotor and the moving part is great and variable, which could cause the rotor to recoil several steps backward after the power supply has been interrupted.

This recoil means that, even if the rotor has gone through an angle corresponding to the number of steps $d_c$, necessary to reach target position $P_c$, that position has not actually been reached. This recoil must therefore be taken into account. The object of the present invention is to propose a system ensuring a high precision of positioning of the part, even in the event of recoil, for a cost as low as possible.

This object is achieved thanks to the fact that, during a so-called positioning phase, the control circuit, after observing that target position $P_c$ has been reached, interrupts the current and applies to the coils a braking pulse of reverse polarity, short-circuits the coils until stoppage observed by the detector, and then verifies that the stoppage position corresponds to the target position $P_c$. In the event of a negative response, start a new cycle again by applying, via the power supply circuit, a voltage across the coil terminals, interrupted by the control circuit in the same conditions as those defined above.

In other words, during this positioning phase, the rotor stops for a brief moment, enabling the assembly formed of the rotor and the moving part to find an equilibrium position. After this, the position of the moving part is checked. If target position $P_c$ has not been reached, a new positioning cycle is initiated. In this way, the computing resources to be employed during rotor movement are limited and the precision aimed at is very high, even with operating conditions which may vary sharply.

Advantageously, the control circuit performs the following operations during this positioning phase:

determination of the number of steps to be executed to reach target position $P_c$;

determination of the number of steps executed by applying a positioning pulse delivering a known energy;

determination of the drive and braking energy values to be supplied by a positioning pulse and a braking pulse respectively to reach target position $P_c$; and control of the power supply circuit so that it may apply to the motor the determined positioning and braking pulses.

By combining the application of a calibrated positioning pulse, then a braking pulse, it is possible to make optimum allowance for fluctuations in the torque dissipated by the rotor and the moving part, and ensure optimum approach.

This approach can be further improved by determining the energy values of the positioning and braking pulses on the basis of the tests performed previously, and in particular by selecting, from a set of alternative solutions recorded in memory, that offering the greatest probability of success.

The operations performed during the positioning phase can be repeated, with selection of the positioning and braking pulses being modified depending on the result obtained, until target position $P_c$ is reached.

It is obvious that the system as described indeed allows precise positioning, but at low speed. Once the number of steps to be executed exceeds a few dozen, it is recommended to apply a procedure enabling work at higher speed, although without losing the required precision. That is why, during a so-called approach phase, the control circuit performs the following operations, after the detector has given the information that the part is motionless:

determination of the position of the moving part, relative to target position $P_c$;

application of a pulse of known energy;

short-circuiting of the coils until stoppage of the part;
determination the new position of the part;
calculation of the number of steps executed by the part due to the pulse applied;
calculation of the energy to be supplied to enable the part to reach target position $P_c$;
application of a pulse whose energy is smaller than—or equal to—that calculated;
short-circuiting of the coils until the part is immobilized; and
if the detector indicates passage through the target position, application of the positioning phase procedure, otherwise resumption of the approach phase procedure.

The positioning phase and the approach phase take place iteratively, with a movement followed by a stoppage during which the effect of the pulses applied is analyzed. In this way, the calculations are performed when the rotor is stopped, thus enabling a reduction in computing power of the control circuit, which is generally implemented by means of a microcontroller.

When the moving part has to cover a distance corresponding to several hundred, or even several thousand steps, it must be possible to have the motor run continuously. Accordingly, prior to the approach phase and to the extent that the number of steps to be executed to reach the target position is greater than a limiting value $d_i$, the control circuit gives the order to the power supply circuit to power the rotor with d.c. current, at a calibrated voltage $U_1$, and counts the number of steps executed based on the information collected by the detector.

To stop the d.c. power supply to the rotor, after the detector has determined that its speed is constant, the control circuit calculates, from the speed reached, the number of steps that could be executed by the part before stopping when the power supply is interrupted and the coils are short-circuited, and then interrupts the power supply and short-circuits the coils when the number of steps remaining to be executed reaches a value equal to the calculated number, possibly increased by a safety factor.

Moreover, when the number of steps to be executed is very great, greater than a limiting value do, the control circuit gives the order to the power supply circuit to power the motor at a maximum voltage $U_0$, greater than $U_1$ and which may be the voltage of the energy source, and merely counts the number of steps executed, then, when the number of steps remaining to be executed is equal to a limiting value defined as a function of $d_0$, the control circuit brings the supply voltage to a value equal to $U_1$.

Other advantages and characteristics of the invention will appear from the following description, referring to the appended drawing, in which.

Figure 1:
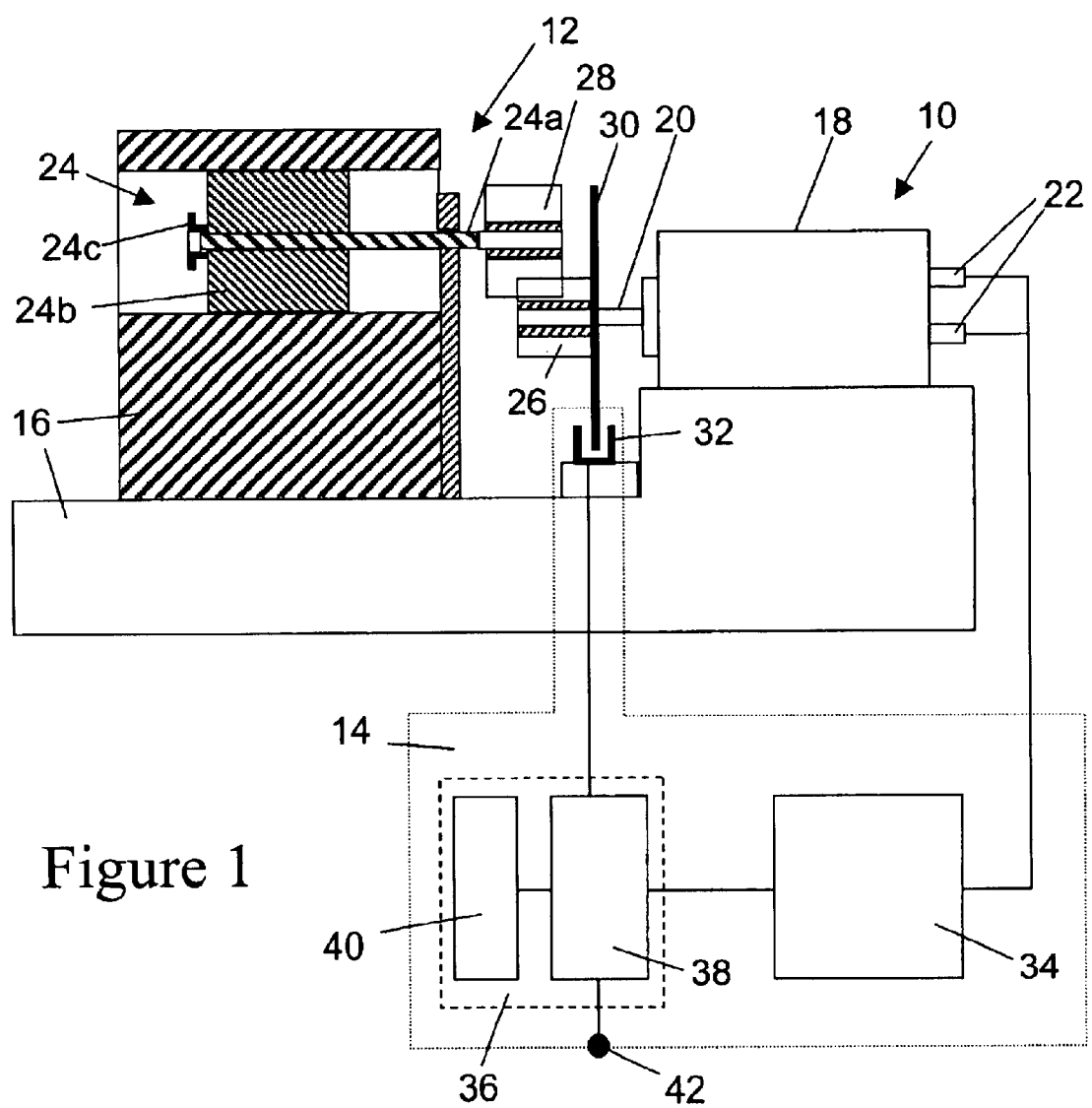
FIG. 1 represents a schematic diagram of an apparatus arranged to implement the system according to the invention.

The apparatus represented in FIG. 1 is designed to control movement of the piston of a liquid dosing syringe, not shown in the drawing. It comprises a motor 10, a tool 12 designed to be actuated by motor 10, a control device 14 for motor 10, a frame 16 on which are assembled the motor 10, the tool 12 and the control device 14, and a source of electric power which has not been represented in the drawing to avoid cluttering it.

Motor 10 is of the direct current type, well known to those in the industry, with a rotor and a stator associated with coils (which are not visible on this figure), housed in a housing 18, which is attached to frame 16. The motor comprises a shaft 20 driven in rotation by the rotor, and two power supply terminals 22 linking it to control device 14.

The tool 12 comprises a worm screw 24 formed of a stud 24a and a nut 24b, which are, conventionally, mounted so as to be able to move in rotation and in translation respectively on frame 16. It also comprises a gear train formed of a drive gear 26, fastened to shaft 20, and a driven gear 28, integral with stud 24a. The nut 24b carries an attachment part 24c, designed to co-operate with the piston of the syringe (which does not appear on the drawing), these together forming a moving part.

Typically, stud 24a comprises between fifty and one hundred thread turns, and nut 24b about twenty. In other words, the motor has to drive stud 24a over thirty to eighty turns for nut 24b to go from one to the other of its extreme positions.

The control device 14 comprises a position detector, formed of a thumbwheel 30 attached to shaft 20 and an optical sensor 32 in quadrature, mounted on the frame 16 so as to co-operate with the thumbwheel 30. It also comprises a power supply circuit 34 to apply the supply voltage to the coil terminals 22, and a control circuit 36, arranged so as to receive information from the sensor 32 and to send orders to the power supply circuit 34.

The thumbwheel 30 and the optical sensor 32 are arranged to enable referencing of several dozen positions, typically sixty per turn of wheel 30. Due to the gear ratio of gears 26 and 28, which is 3 in the example, it is possible to define about one hundred and eighty steps per turn of stud 24a.

The power supply circuit 34 is implemented by means of an H-bridge, so as to provide the motor with the necessary power and be able to reverse the polarity of its power supply, thus enabling its rotor to rotate in both directions.

The control circuit 36 comprises basically a microcontroller 38, a memory 40 and a control terminal 42, permitting communication with an external computer to send orders to microcontroller 38, enter a program or read the contents of the memory 40. The control terminal could also be a simple push button capable of actuating start-up of the system.

The memory 40 contains, in permanent or reprogrammable fashion, a set of parameters characteristic of the apparatus shown on FIG. 1, which will be specified below.

A voltage stabilization circuit can be advantageously inserted between the energy source and the control circuit 36, to ensure their correct operation, especially if the voltage and the internal resistance of the energy source fluctuate strongly, which can be the case when the energy source is a rechargeable battery.

To have a good understanding of the system implemented in the apparatus described, it should be known that when driving in rotation the rotor of a d.c. motor, the torque to be applied varies as a function of the angular position, but less sharply than with a stepping type motor. This has the advantage of permitting rotor stoppage in intermediate positions. It is, on the other hand, impossible to predict precisely the quantity of energy to be supplied to cause the thumbwheel 30 to move forward one step and, with it, the moving part.

In other words, there is no longer any proportionality between supply voltage and speed, specially when the latter is low. Moreover, the energy to be supplied to the piston can vary considerably from one application to another, depending on the syringe used and the liquid to be dispensed.

To ensure the function required of it, the apparatus as described must be fast, precise and economical. Speed is obtained by causing the motor to operate at high speed when the path to be covered is long. Precision is guaranteed by the control mode employed when the target to be reached is nearby. Finally, the low cost is due to the fact that the d.c. motor is economical, especially because of the very large quantities manufactured, and the program applied does not require very great computing power.

Figure 2A:
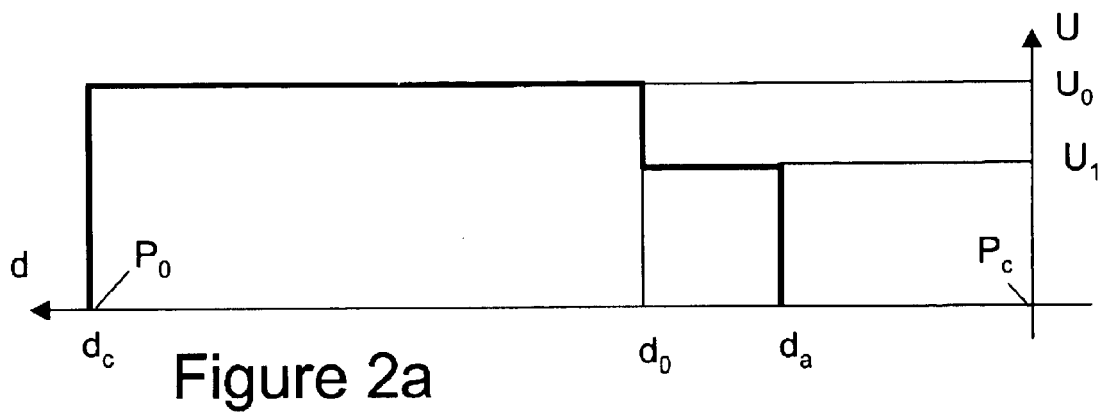
FIG. 2 shows, schematically, the way in which the apparatus in FIG. 1 proceeds.
Figure 2B:
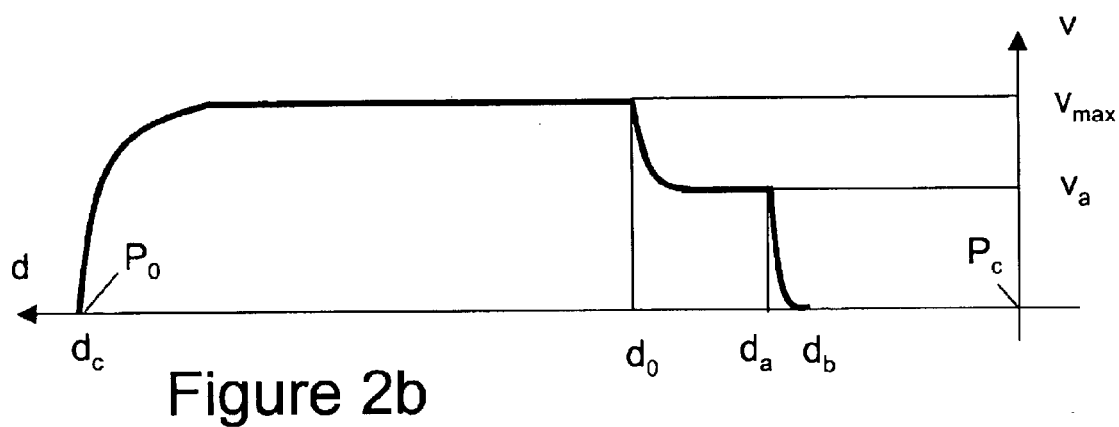
Figure 3A:
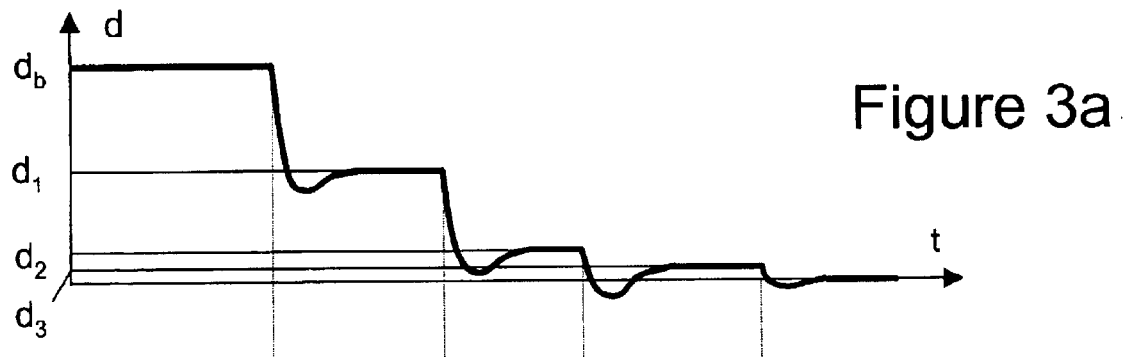
FIGS. 3 and 4 are flowcharts of the programs implemented in the apparatus of FIG. 1.
Figure 3B:
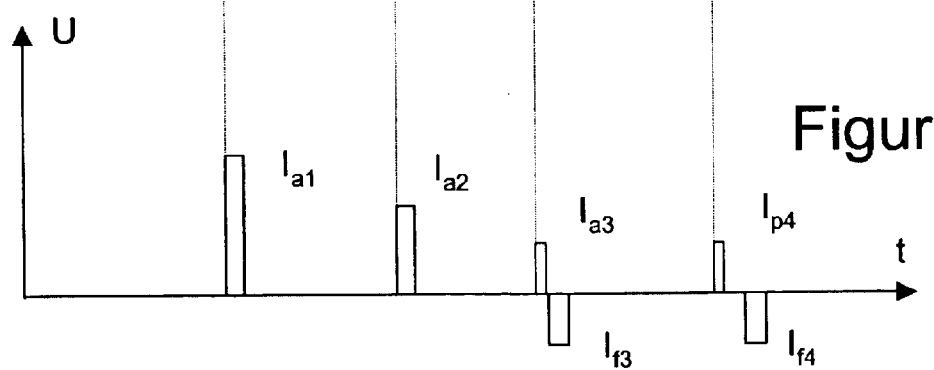

The system employed for control of the apparatus described comprises two very different operating modes, represented schematically on FIGS. 2 and 3 respectively. The first mode is characterized by continuous rotation of the motor, with a first rapid phase and a second controlled phase. The second mode is characterized by pulsing control, with an initial approach phase and a second positioning phase. These modes will be described in principle before an explanation is given of the flowcharts for the programs applied by the microcontroller 38 to control the motor 10.

FIG. 2 shows how the supply voltage $\underline{U}$ varies in $\underline{a}$ and the rotor speed $\underline{v}$ varies in $\underline{b}$, depending on the number of steps $\underline{d}$ remaining to be executed, from starting position $P_0$ up to target position $P_c$, located at the origin of the coordinate system.

For the apparatus to be able to operate, the microcontroller 38 must, of course, be able to access its control program, which must therefore be recorded in the memory 40. The latter contains, moreover, programmed in permanent or reprogrammable manner, parameters relating to the motor's power supply. An initial set of parameters corresponds to limiting values relating to the changes to be made to the power supply mode, as will be explained further on, and a second set of parameters defines more specifically how the motor is to be powered during the phase allowing rotor positioning with a view to reaching the target position with maximum precision.

The apparatus is initialized by placing the nut 24b in either one of the extreme positions of the stud 24a, depending on whether the syringe is to suck in or dispense liquid, fastening the piston to the attachment part 24c and entering in the memory 40 the number of steps $d_c$ that the motor has to execute to perform its function, i.e. to reach the target position $P_c$.

When the microcontroller 38 observes that the number of steps to be executed $d_c$ exceeds a limiting value $d_0$ forming part of the initial set of parameters recorded in the memory 40, which is typically equal to eight hundred, it gives the order to power supply circuit 34 to apply to the terminals 22 of the motor a voltage $U_0$ similar to the voltage U of the energy source. As can be seen on FIG. 2b, the rotor speed $\underline{v}$ then increases until it reaches a speed limit $v_{max}$.

The apparatus operates thus in the fast phase, in d.c. power supply mode.

As soon as the motor 10 is set in movement, microcontroller 38 decrements the value $\underline{d}$, contained in memory 40, from the information received from optical sensor 32. When $\underline{d}$ corresponds to $d_0$, microcontroller 38 gives the order to reduce the supply voltage to a value $U_1$. This voltage $U_1$, lower than $U_0$, is obtained by chopping of the supply voltage U; the ratio between times when the voltage is equal to U and times when it is null defines the voltage $U_1$.

The apparatus has thus gone from the fast phase to the controlled phase.

Due to this change in the supply voltage, the motor slows sharply, to reach a reduced speed $v_a$. When this speed is stabilized, microcontroller 38 calculates the number of steps $\underline{N}$ necessary for the rotor to stop, with the coils being short-circuited. $\underline{N}$ can be defined from the speed $v_a$, provided the supply voltage $U_1$ is constant, through computation or by means of comparison tables recorded in the memory 40.

The voltage $U_1$ is chosen so that the decrementing operation may be performed by the microcontroller 38 in alternation with the computation of $\underline{N}$, and to avoid the latter value being too great, so as to ensure good control of rotor stoppage, as will be explained further on.

The value $\underline{N}$ can advantageously be adjusted to allow for a safety factor ensuring that the rotor will not stop beyond the target position $P_c$. To make sure that the speed is stabilized, microcontroller 38 can compare the number of steps executed in equal time intervals. It can also, more simply, wait for a sufficiently long time to be certain that deceleration is completed.

The voltage $U_1$ is interrupted when $\underline{d}$ reaches a value $d_a$ equal to $\underline{N}$. The coils of motor 10 are then short-circuited and the motor slows gradually until stopping in $d_b$. Practice has shown that the different variables mentioned earlier mean that stoppage occurs generally between 5 and 30 steps from the target position $P_c$. When the motor is stopped, the microcontroller 38 then goes into the second control mode, by pulsing, illustrated on FIG. 3.

FIG. 3 shows, in this case versus time, in $\underline{a}$, the number of steps $\underline{d}$ remaining to be executed to reach the target position $P_c$ and, in $\underline{b}$, the control voltage $\underline{U}$ applied in the form of pulses $\underline{I}$ to reach this position.

The motor being stopped, the microcontroller 38 calculates, as a function of the value $d_b$, the energy $E_{a1}$ that a pulse would have to supply to the rotor to enable it to reach the target position $P_c$ or to stop short of it. The motor thus receives a pulse $I_{a1}$ applying to the rotor the energy $E_{a1}$, which causes it to go from position $d_b$ to position $d_1$ in a damped movement which could end with a recoil typically ranging between 1 and 3 steps. This recoil is greatly exaggerated on the drawing.

As soon as the pulse is ended, the coils are short-circuited to dampen the rotor oscillations as quickly as possible. In the example shown in FIG. 3, there is a second pulse $I_{a2}$, for which the energy supplied $E_{a2}$ is defined in the same way as $E_{a1}$. $E_{a2}$ is less than $E_{a1}$ as soon as the path remaining to be covered is shorter. $E_{a2}$ is applied to the motor, the position measured then going from $d_1$ to $d_2$.

The energy $E_{a3}$ of the following pulse $I_{a3}$ is such that the rotor reaches the target position $P_c$, confounded with the origin of the y-axis. The microcontroller 38 then sends a pulse $I_{f3}$, of reverse polarity and of energy $E_{f3}$, which blocks the rotor and can even cause it to recoil. As soon as pulse $I_{f3}$ is ended, the coils are short-circuited so as to brake the motor to a maximum. In spite of this, and due to the elastic forces in presence, it may be that the rotor recoils by one or more steps, reaching the position $d_3$. During the latter operation, the microcontroller 38 has gone from the approach phase to the positioning phase, characterized by the systematic application of a braking pulse $I_f$ after each positioning driving pulse $I_p$.

If the target has not been reached in a stable manner, as shown in the drawing, the microcontroller 38 makes a new attempt, applying a drive pulse $I_{p4}$, of energy $E_{p4}$, followed by a pulse $I_{f4}$ of energy $E_{f4}$, the characteristics of $I_{p4}$ and $I_{f4}$ being chosen from a set of data forming part of the second parameters found in the memory 40 and having the greatest probability of reaching the target position $P_c$, depending on the number of steps executed due to the effect of pulses $I_{a3}$ and $I_{f3}$.

This operation can be repeated several times, with further adjustment of the parameters. After each new braking pulse $I_f$, the coils are short-circuited for a few seconds, so that the rotor may be blocked and the various moving parts can reach their rest position.

Thus, thanks to this strategy, it is possible to guarantee precise movement of the piston, despite the elastic forces in presence.

Figure 4A:
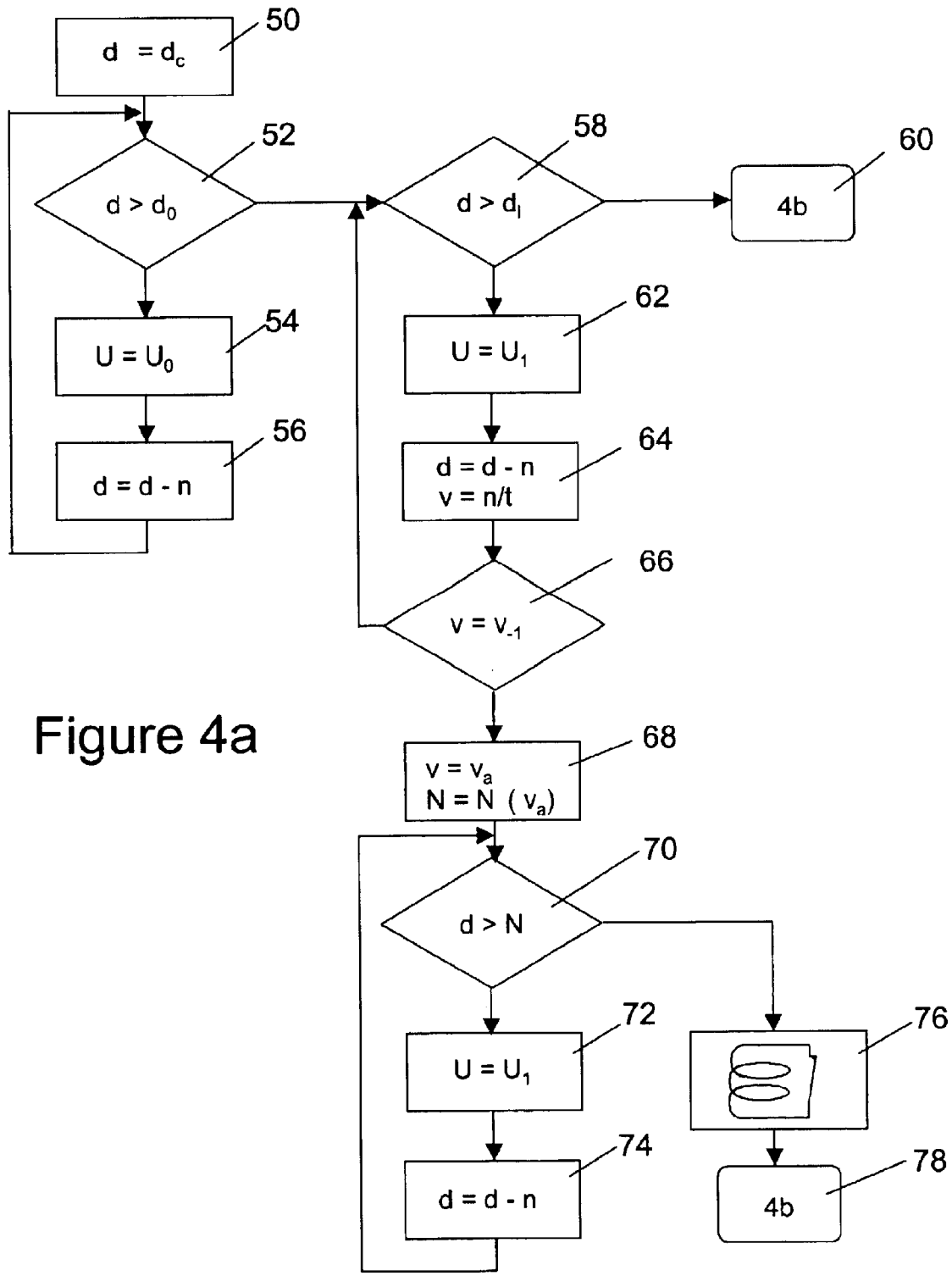

FIG. 4 shows the flowchart of the program applied by microcontroller 38 to control the motor 10, the part relating to the continuous operating mode being represented in a, and that concerning the pulsed operating mode in b. On this figure, and for all control operations, a positive response corresponds to a vertical output and a negative response to a horizontal output.

Microcontroller 38 initiates the system in 50, memorizing the number of steps $d_c$ to be performed in the memory 40, which will be decremented, based on the pulses coming from the optical sensor 32, to give the instantaneous value d of the number of steps remaining to be executed until the target position $P_c$ is reached. It verifies in 52 that $d_c$ is greater than the limiting value $d_0$. If such is the case, in 54, the voltage $U_0$ is applied continuously to the circuit 34, and in 56 the value d is decremented by the number of steps n counted by the optical sensor 32. The apparatus thus operates in rapid phase, the task of the microcontroller being limited to decrementing d and verifying that $d_0$ has not been reached. The microcontroller 38 begins again in 52, until the number of steps remaining to be executed d is smaller than or equal to $d_0$.

Figure 4B:
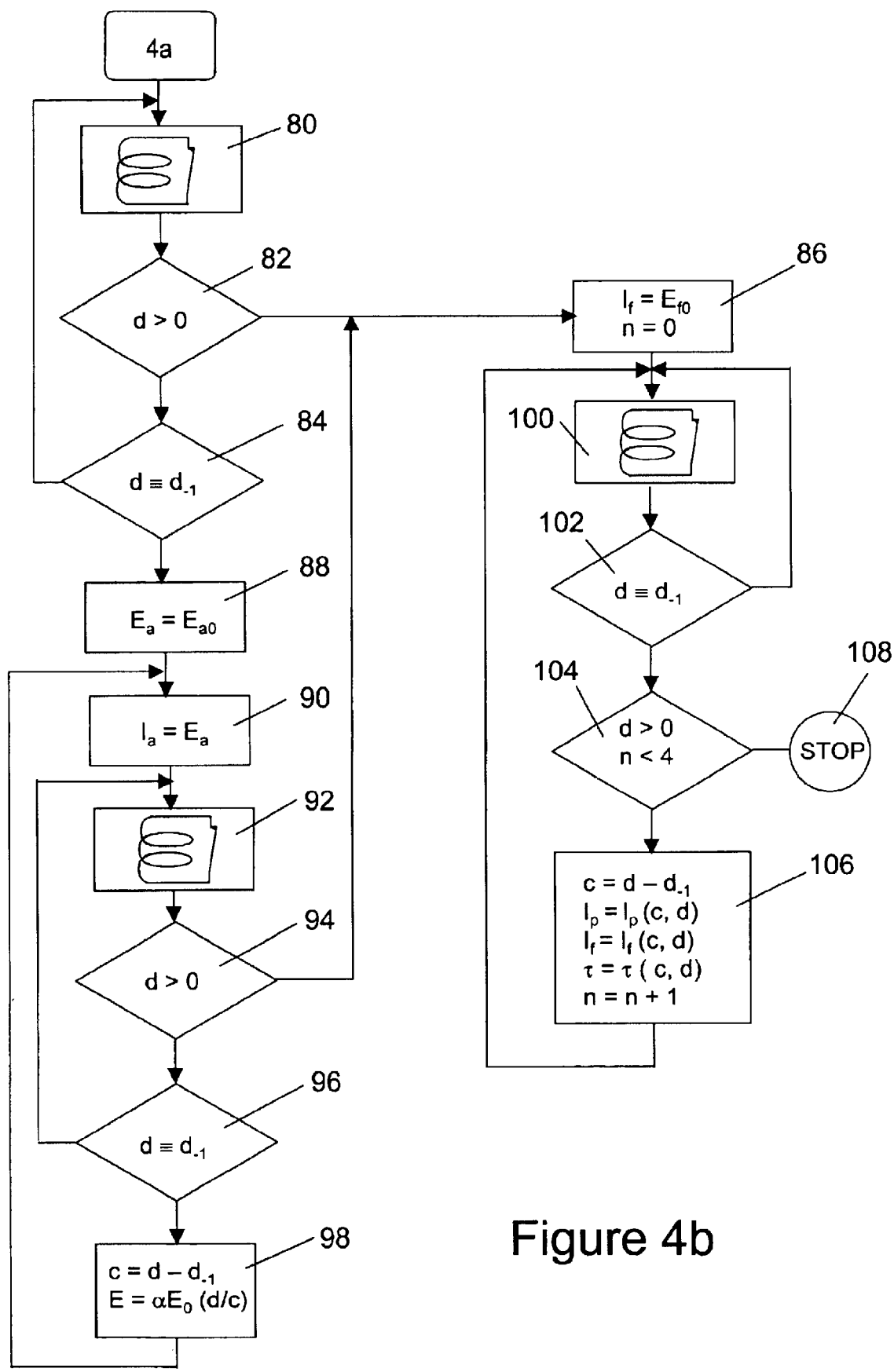

When this is the case, the functions defined in 54 and 56 having been applied or not, the program goes to 58 where it determines whether the number of steps d remaining to be executed is greater than a limiting value $d_l$ below which the program goes into pulse mode in 60, described with reference to FIG. 4b. The value of $d_l$ corresponds to the number of steps essential to ensure controlled actuation in d.c. power supply mode. This situation occurs only when the total number of steps to be executed is very small, i.e. less than $d_l$, the value of which is a few tens of steps at most.

If the number of steps remaining to be executed is sufficient, the control circuit 36 goes into controlled phase, by bringing in 62 the supply voltage to $U_1$, by chopping the nominal voltage and by continuing with decrementing of the step counter in 64, while determining the instantaneous speed v, equal to the ratio between the number n of steps executed between two measurements, i.e. $d_{-1}$–d, and the time t necessary to execute them. It then verifies in 66 whether the speed has reached a constant regime. So long as the response is negative, a new cycle starts again in 58.

It is also possible to be content with a measurement of the time that has elapsed since the transition to controlled phase, the time limit being chosen so that the apparatus can have reached stable operating conditions.

When the speed is stable, the microcontroller 38, in 68, memorizes the stable speed $v_a$ and determines, as a function of the latter, the number N of steps necessary to allow the apparatus to be stopped at the target position or before. This value is defined as the limit of d for drive in d.c. power supply mode. The microcontroller 38 then verifies in 70 that the number of steps remaining d is greater than N. So long as this is the case, the supply voltage is maintained at the value $U_1$ in 72 and the step counter is decremented in 74.

When this limiting value N is reached, the power supply coil is short-circuited in 76, then the program continues in pulsing mode in 78. The following operations are described with reference to FIG. 4b.

In the pulsing mode, an initial, so-called approach phase, allows the target position $P_c$ to be approached, and a second, so-called positioning phase, allows the apparatus to be positioned on the target position or on a very nearby position.

The first phase starts with the continued short-circuiting of the coil, as shown in 80. During this time, the microcontroller 38 verifies in 82 that the target position $P_c$ is not reached, and in 84 that the wheel 30 is stopped. So long as the target position has not been reached and the wheel is rotating, the short-circuit is maintained. If, already at this stage, the target position $P_c$ were reached, the program would continue in 86, as will be explained further on.

If the target position $P_c$ has not been reached, the microcontroller 38 defines in 88 the energy $E_a$ to be supplied to the rotor, equal to a calibrated value $E_{a0}$, then gives, in 90, the order to the power supply circuit to apply to the rotor a pulse $I_a$ of energy equal to $E_a$. As soon as the pulse has ended, the coil is short-circuited in 92, the microcontroller 38 verifies that the target position $P_c$ has not been reached in 94, and then that the wheel 30 is stopped in 96. As soon as the position $P_c$ has been reached, the program continues in 86. So long as this is not the case, and as soon as the wheel 30 is stopped, microcontroller 38 calculates, in 98, a value c equal to the number of steps $d-d_{-1}$ executed due to effect of pulse $I_a$ and a value E equal to the value $E_{a0}$ multiplied by the ratio d/c and by a safety factor α smaller than or equal to 1, chosen so as to prevent the energy supplied from causing non-standard overshooting of the target position $P_c$. When the number of steps remaining is less than 5, α is equal to 1. The program then resumes in 90.

At the time when the wheel 30 goes through the target position $P_c$, detected in 82 or 94, the microcontroller 38 initializes a number n=0, corresponding to the number of times that the microcontroller 38 has tried to reach the target position $P_c$, and reacts by actuating the application of a pulse $I_f$ of reverse polarity to that of the $I_a$ pulses, calibrated to deliver an energy E equal to $E_{f0}$, corresponding to a pre-established typical value selected from memory 40. This pulse $I_f$ brakes the rotor, so that it stops very rapidly. As soon as the pulse is ended, the coil is short-circuited in 100, then the microcontroller 38 verifies that the wheel 30 is stopped in 102. So long as this is not the case, the short-circuit is maintained.

During the entire short-circuit period, the wheel first stops, then begins to recoil due to the elasticity of the components of the instrument and of the liquid dispensed. The recoil can be more or less great depending on the operating conditions.

When the wheel 30 is stopped, the microcontroller 38 verifies that the target position $P_c$ is not exceeded and that the number of tests performed n is less than 4. It then increments by 1 the value of n and it determines the number of steps executed c.

Based on this information, the microcontroller 38 determines the values of $I_p$ and $I_f$, and a time interval τ ranging between the passage through $P_c$ and the start of pulse $I_f$. These parameters are determined by extrapolation and then by experiment.

After this, the program resumes in 100 the operations allowing wheel 30 to be positioned. Stages 100 to 106 are repeated until the target position is reached, but at most a given number of times, typically 4, to avoid program looping in the event of dysfunctioning. The operation ends in 108, when the target has been reached or the number of positioning attempts has reached the acceptable limit.

The apparatus and the system implemented by means of it, which were described above, can, of course, have numerous other applications than moving the piston of a syringe.

They are applicable in all situations in which a movement must be performed precisely, for a low cost, especially when the drive line inserted between the rotor and the moving part has a certain mechanical elasticity.

It will be noted that the system described is very efficient and requires low computing power due to the fact that, when the rotor works at high speed, i.e. in rapid phase, the microcontroller performs a very limited number of functions, whereas during the positioning phase, which requires the greatest number of operations, most of these operations can be performed with the rotor idle.

The implementation of the system according to the invention requires determining the various parameters taken into account. These are determined mainly in empirical fashion, through practical tests during which the various foreseeable situations are taken into account.

Note, too, that if the values stored in memory do not enable the target position to be reached, the microcontroller can advantageously inform the person in charge of the experiment, by an audible alarm or by written information, transmitted via the control terminal 42.

What is claimed is:

1. Control system for a d.c. motor (10) of the type comprising a rotor and a stator, a coil assembly having a plurality of coils and a magnetic circuit, one integral with the rotor and the other with the stator, the rotor being driven in rotation by an electric current passing through the coils, and powered by a control system (14) comprising:

a position detector (30, 32) co-operating with the rotor;

a power supply circuit (34) to apply to the terminals of the coils a supply voltage to generate the electric current, and a control circuit (36), with a view to enabling a moving part (24), actuated by said motor (10) and the movement of which is measured by said detector (30, 32), to reach a target position $P_c$ defined by a number of steps $d_c$ to be executed;

characterized in that, during a positioning phase, the control circuit (36), performs the following operations determining the number of steps (d) to be executed to reach the target position $P_c$;

determining the number of steps executed (c) by applying a pulse ($I_a$) delivering a known enemy ($E_{ao}$);

determining the drive energy ($E_p$) and braking energy ($E_f$) to be supplied by a positioning pulse ($I_p$) and a braking pulse ($I_f$) respectively to reach said target position $P_c$; and controlling the power supply circuit (34) for applying the determined positioning pulses ($I_p$) and braking pulses ($I_f$) to said motor (10)

short-circuits said coils until stoppage is observed by said detector (30, 32), comparing the stoppage position with the target position $P_c$ and, if the target position $P_c$ has not been reached, starting a new cycle by applying a voltage across the terminals of said coils via the power supply circuit (34).

2. System according to claim 1, characterized in that the determination of said drive energy ($E_p$) and said braking energy ($E_f$) is performed by selecting, from a series of alternative solutions recorded in memory (40), that having the greatest probability of success.

3. System according to claim 1, characterized in that the operations performed during the positioning phase are repeated, the choice of positioning pulses ($I_p$) and braking pulses ($I_f$) being modified depending on the result obtained, until said target position $P_c$ is reached.

4. System according to claim 1, characterized in that, during an approach phase, said control circuit (36) performs the following operations, after said detector has given information that said part is motionless:

determination of the position of the part (24) relative to target position $P_c$;

application of a pulse ($I_a$) of known energy ($E_a$);

short-circuiting of the coils until stoppage of said part (24);

determination the new position of the part;

calculation of the number of steps (c) executed by the part due to said pulse;

calculation of the energy (E) to be supplied to enable the part to reach target position $P_c$;

application of a pulse ($I_a$) whose energy is smaller than— or equal to—that calculated;

short-circuiting of the coils until said part (24) is immobilized; and if the detector (30, 32) indicates passage through the target position $P_c$, application of the positioning phase procedure, otherwise resumption of the approach phase procedure.

5. System according to claim 4, characterized in that, prior to the approach phase and to the extent that the number of steps to be executed $d_c$ to reach the target position is greater than a limiting value $d_1$, the control circuit (36) gives the order to said power supply circuit (34) to power the motor continuously, at a calibrated voltage $U_1$, and counts the number of steps (d) remaining to be executed based on the information collected by said detector (30, 32).

6. System according to claim 5, characterized in that, when the rotor speed (v) is constant, the control circuit (36) calculates, from the speed reached ($v_a$), the number (N) of steps that could be executed by the part before it stops when the power supply is interrupted and the coils are short-circuited, then interrupts the power supply and short-circuits the coils when the number of steps (d) remaining to be executed reaches a value equal to or slightly greater than the calculated number (N).

7. System according to claim 6, characterized in that the control circuit (36) gives the order to the power supply circuit (34) to power said motor at a voltage $U_0$, greater than $U_1$ and which may be equal to the nominal voltage of the energy source, when the number of steps $d_c$ is greater than a limiting value $d_0$ and counts the number of steps remaining to be executed (d) until it is substantially equal to $d_0$, and the control circuit (36) brings the supply voltage (U) to said calibrated voltage ($U_1$).

* * * * *